United States Patent [19]

Kluge

[11] 3,770,978

[45] Nov. 6, 1973

[54] MAGNETIC BUBBLE DOMAIN SWITCHING DEVICE

[75] Inventor: Werner Erich Kluge, Kanata, Ontario, Canada

[73] Assignee: Bell Canada-Northern Electric Research Limited, Ottawa, Ontario, Canada

[22] Filed: June 12, 1972

[21] Appl. No.: 261,589

[52] U.S. Cl. ........................ 307/88 LC, 340/174 TF
[51] Int. Cl. ............................................ G11c 11/14
[58] Field of Search .............................. 340/174 TF

[56] References Cited

UNITED STATES PATENTS 3,638,208 1/1972 Chow ........................... 340/174 TF
3,543,255 11/1970 Morrow et al. ............... 340/174 TF

*Primary Examiner*—James W. Moffitt
*Attorney*—Sidney T. Jelly

[57] ABSTRACT

A switching device for magnetic bubble domains which can be used to carry out three functions:— AND, duplication and inversion. The device is defined by a magnetizable overlay pattern in which magnetic bubble domains in two main channels can be caused to propagate either along the main channels from input to output or along interconnecting channels from the input on one main channel to the output on the other main channel. Deflection is by interaction positions on a control channel. The number of propagation steps from any input position to any output position is equal. Domain idling positions occur at intersections of any channels.

4 Claims, 16 Drawing Figures

MAGNETIC BUBBLE DOMAIN SWITCHING DEVICE

This invention relates to switching devices for magnetic bubble domains, and in particular, though not exclusively, to transfer gates for logic functions such as a switching device for the comparison of two logic variables.

In electrical structures or circuits, signals can be transferred, divided, added and otherwise handled simply and straightforwardly. For example, an input can readily be arranged to appear at any output, or plurality of outputs. Outputs can readily be combined or further divided, merely by electrical connections.

For magnetic bubble domains, hereinafter referred to as bubbles, manipulation of signals is not so easy, since bubbles are physical entities which do not have fan-out and which cannot be merged because of mutual repulsion. Thus if signals are combined this normally requires annihilation of a bubble and to divide a signal requires generation of a bubble. Bubble generators and annihilators in a bubble device take up valuable space and result in increase in size, and cost.

The present invention provides for the manipulation of bubbles such that bubble annihilation and/or generation is at least reduced to a minimum. A switching device is provided where input signals are not changed, or lost, with several inputs and minimum outputs, the invention providing a system having as many channels as possible where signals are not changed and a minimum number of outputs where signals have to be annihilated.

The invention will be understood by the following description of one particular embodiment in conjunction with the accompanying drawings, in which.

In a logic it is necessary to be able to carry out the three functions:— AND, duplication, and inversion. If these can be done with bubbles it is possible to carry out any function. With bubbles it is possible to do the following functions:— annihilation, generation, transfer. These are not sufficient to meet all three conditions previously stated as necessary. To be sufficient it must be possible to make one of those functions conditional.

A bubble device utilizes the interaction between the bubbles, on orthoferrite or garnet platelets, the bubbles under the influence of a suitable magnetostatic field. When assigning to a platelet a certain, finite number of locations then binary information can be represented by the presence or absence of bubbles at these locations. All combinational functions can be computed by means of bubble generation, annihilation and transfer provided, as stated previously, one of these manipulations is applied conditionally, i.e. their execution depends upon the particular information to be computed.

Most useful from the practical point of view are conditional transfer operations. These operations are bubble conserving, i.e. devices which perform transfer functions, propagate all bubbles from input channels to the output channels, without generating, annihilating, merging or splitting bubbles themselves.

The simplest form of a conditional transfer device resembles a transfer relay. It has a control channel, an input channel $x$ and two output channels $y_1$ and $y_2$. If a bubble entering $x$ coincides with a bubble entering the control channel, then it moves, for instance, to channel $y_1$; if there is no bubble in the control channel, then it moves to channel $y_2$. This gate can perform the basic logic functions AND, inversion and duplication. All computations can therefore be performed by appropriate networks composed of these gates.

However, for particular applications especially in the area of associative processing where comparisons have to be performed it is often more efficient to combine such transfer gates to submodules in order to realize more complex and suitable functions, and to provide more space economy on the platelet.

Figure 1:
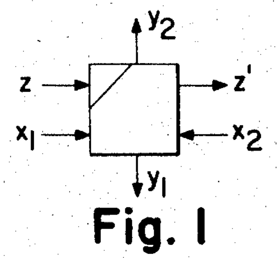
FIG. 1 is a block diagram of a two-way conditional transfer gate.

FIG. 1 is a block diagram of a transfer gate with two input channels $x_1$ and $x_2$; two output channels $y_1$ and $y_2$, and a control channel $z$. The operation is as follows: Bubbles entering the inputs $x_1$ and/or $x_2$ are being propagated to the outputs $y_1$ and/or $y_2$ if a bubble is entering the control channel $z$ at the same time. If the control channel is empty in the particular time slot, then bubbles entering $x_1$ and/or $x_2$ are being propagated to the output channels $y_2$ and/or $y_1$ respectively, thus, in fact, performing a cross-over.

The logic functions are therefore given as follows:

$$y_1\ (t + \Delta t) = x_1\ (t) \cdot z(t) \quad x_2(t) \cdot z(t)$$
$$y_2\ (t + \Delta t) = x_1\ (t) \cdot z(t) \quad x_2(t) \cdot z(t)$$
$$z_1\ (t + \Delta t) = z(t)$$

where $t$ means the time, at which bubbles enter $x_1$, $x_2$, $z$ respectively and $t$ means the propagation time from input to output.

There are a large variety of potential applications for this device, since the fundamental logic equations, i.e. the minterm representation or the identity function between two binary patterns, can be decomposed into cascades of the above expressions.

Figure 2:
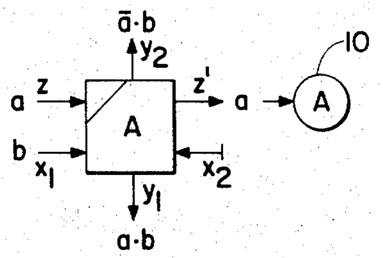
FIG. 2 is a block diagram illustrating an AND gate.
Figure 3:
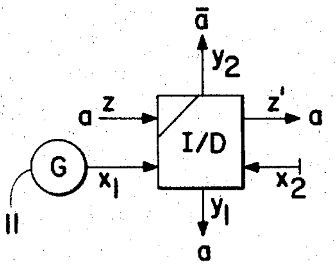
FIG. 3 is a block diagram for an inversion and duplication gate.

FIGS. 2 and 3 show the realization of the basic functions AND, inversion and duplication; FIG. 2 for AND and FIG. 3 for inversion and duplication. The AND function between two variables $a$ and $b$ can be computed by furnishing $a$ to the control input $z$ and $b$ to $x_1$ or $x_2$. In the first case, the result appears on output $y_1$, whereas $y_2$ carries $a \cdot b$. The output on $z'$ is annihilated by annihilator 10. The opposite holds for the second case.

Inversion and duplication can be performed simultaneously by furnishing $a$ to the control channel $z$, and at the same time furnishing the output of a bubble generator 11 to $x_1$ ($x_1 = 1$), whereas $x_2$ is left open ($x_2 = 0$). Then, the outputs are:

$$z' = a,\ y_1 = a,\ y_2 = a.$$

Similarly, for $x_1 = 0$, $x_2 = 1$ holds:

$$z' = a,\ y_1 = a,\ y_2 = a.$$

Figure 4:
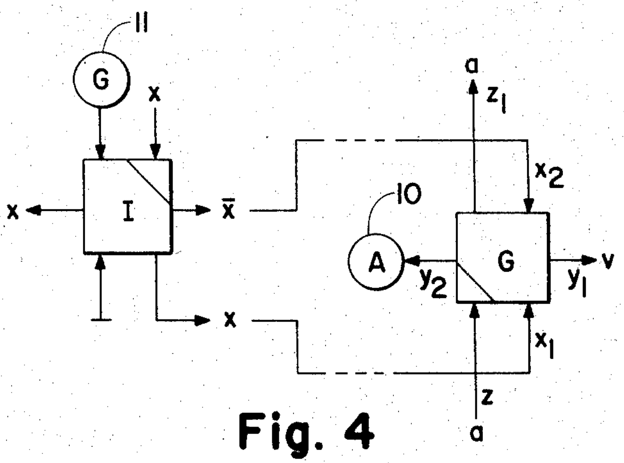
FIG. 4 is a block diagram for a comparator.

FIG. 4 illustrates a circuit consisting of two gates, thereby performing a comparison between two variables $a$ and $x$, i.e. the function $$v = a \cdot x \quad ax$$

which is $v = 1$ if $a = x$ and $v = 0$ if $a \quad x$.

The first gate I inverts $x$ into $x$ and at the same time produces another bubble for $x$ by generator 11 so that the original input can be preserved. $x$ and $x$ are furnished to the inputs $x_1$ and $x_2$ of the second gate G, which also receives $a$ at the control input $z$, thereby producing $v$ at the output $y_1$, while preserving a at the output $z'$. The output at $y_2$ is annihilated by annihilator 10.

Figure 5:
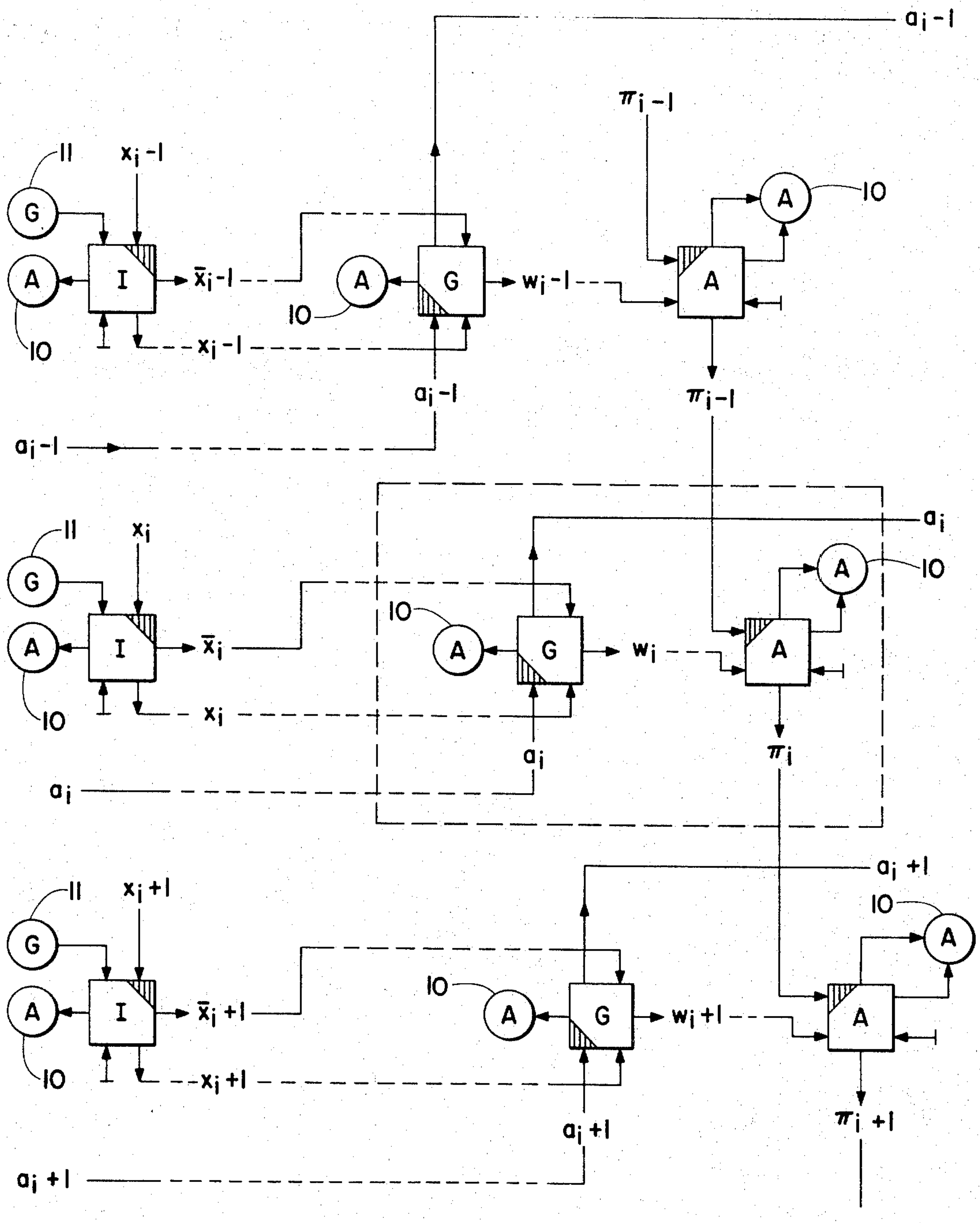
FIG. 5 is a block diagram for an input comparison part of an associative memory.

This comparator can be used as the basic building block for programmable logic systems or associative memories, where two patterns have to be compared digit by digit for identity, thereby computing $$z = \pi_i \, (x_i a_i \;\; x_i a_i)$$

where $z = 1$ only and only if all $x_i = a_i$. A typical diagram for such a system is shown in FIG. 5, using combinations of gates as in FIGS. 2, 3 and 4.

Figure 6:
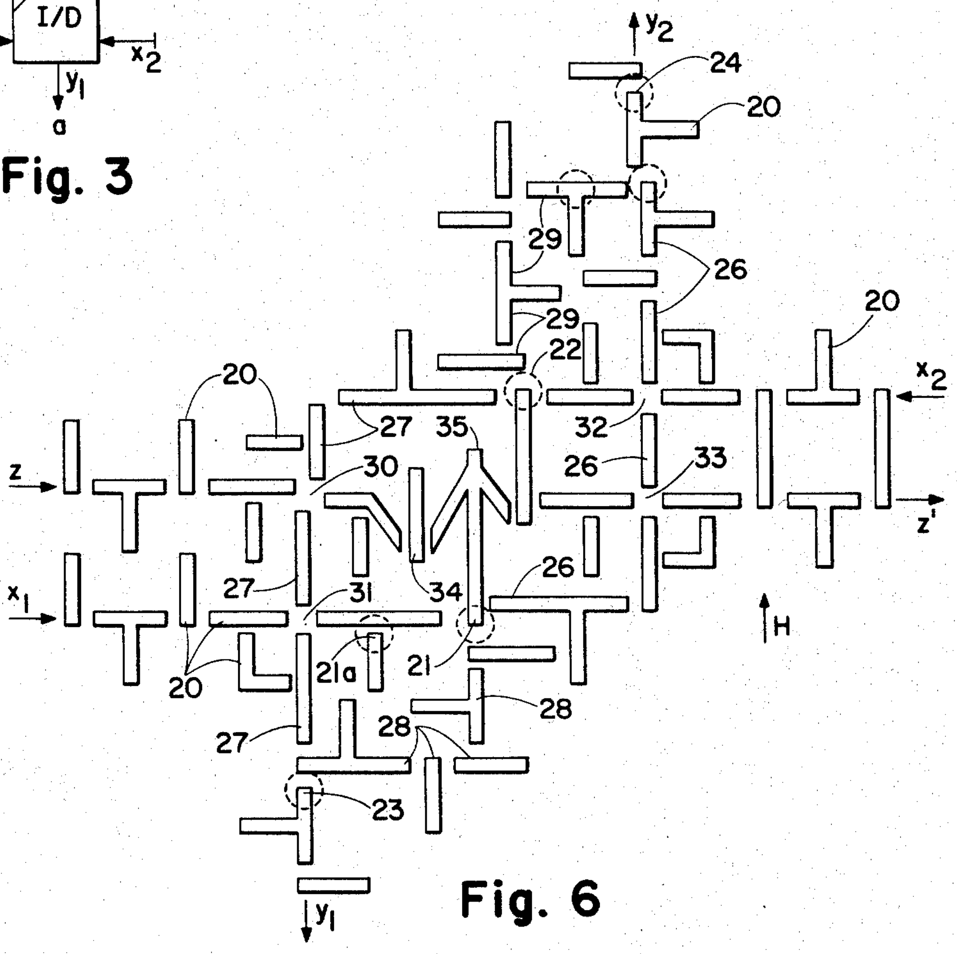
FIG. 6 shows one form of overlay portion for a switching device in the form of a transfer gate in accordance with the invention.

FIG. 6 illustrates one form of switching device which employs a permalloy-overlay pattern 20 and an in-plane rotating field. Bubble propagation occurs in the normal manner. A clockwise rotating field progagates bubbles in input channel $x_1$ to an input position 21 from left to right, FIG. 6; in input channel $x_2$ to an input position 22 from right to left; in control channel $z$ from left to right; in output channel $y_1$ from an output position 23 downward and in output channel $y_2$ from an output position 24 upward.

Input position 21 and output position 24 are connected by a first main channel 26 and input position 22 and output position 23 are connected by a second main channel 27. Interconnecting input position 21 and output position 23 is a first interconnecting channel 28 and interconnecting input position 22 and output position 24 is a second interconnecting channel 29.

As will be seen from FIG. 6, the various channels form a related pattern. Thus the input channels $x_1$ and $x_2$ extend parallel to each other spaced on either side of the control channel $z$ and arranged for bubble propagation in opposite directions toward a central position. The main channels 26 and 27 also extend parallel to each other and cross-over the control channel $z$, bubbles propagating in opposite directions to the output positions 23 and 24 spaced in a direction away from the control channel. The interconnecting channels 28 and 29 yet again extend in directions parallel to each other but on either side of the control channel and with bubbles propagating in the interconnecting channels in an initial direction away from the control channel.

Input positions 21 and 22 and output positions 23 and 24 are associated with a downward orientation of the rotating field, as considered in FIG. 6. Thus the propagation times between inputs and outputs is a multiple of a complete rotation cycle of the in-plane field. Bubble idler positions 30, 31, 32 and 33 are provided at intersections of channels. An intersection position 34 in the control channel $z$ is adjacent input position 21 and a further interaction position 35 is adjacent input position 22.

It should be appreciated that a bubble cannot be at input position 21 at the same time as a bubble is at input position 22. The particular positions indicated would only be occupied by bubbles at times half a cycle apart. Assuming the rotating in-plane magnetic field being upwardly orientated in FIG. 6, as indicated at H, then a bubble could be at input position 22, but a bubble approaching input position 21, would be at 21*a* at this instant. A further condition is that, although at an initial "switch-on" condition the idler positions 30, 31, 32 and 33 are empty, initial propagation results in a bubble being situated in each idler and therefore, there is always a bubble in or associated with each of the idler positions.

Figures 7A, 7B:
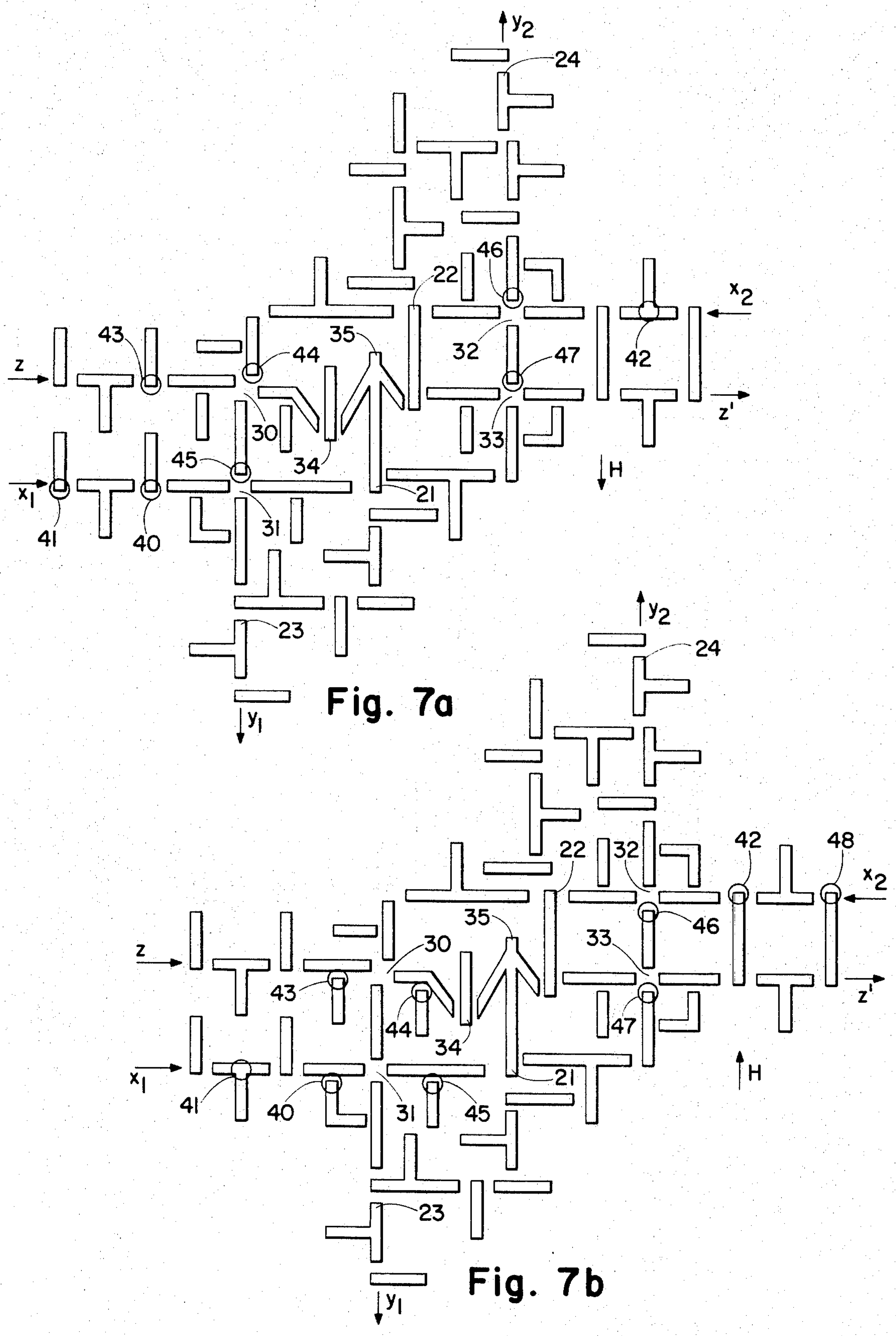
FIGS. 7*a* to 7*j* show the sequences of bubble propagation in the device of FIG. 6.

FIGS. 7*a* to 7*j* illustrate sequences of bubble propagation. In FIG. 7*a*, bubbles 40 and 41 are shown propagating in the input channel $x_1$, bubble 42 is shown in input channel $x_2$ and bubble 43 in the control channel $z$. Further bubbles 44, 45, 46 and 47 are shown at the idlers 30, 31, 32 and 33 respectively. In FIG. 7*b* the in-plane field has rotated by one half period. Bubbles 40 and 43 approach the idlers 31 and 30 respectively and repel bubbles 44 and 45 from the idlers to continue in channels $z$ and $x_1$ respectively. A further bubble 48 is now propagating in input channel $x_2$.

Figures 7C, 7D:
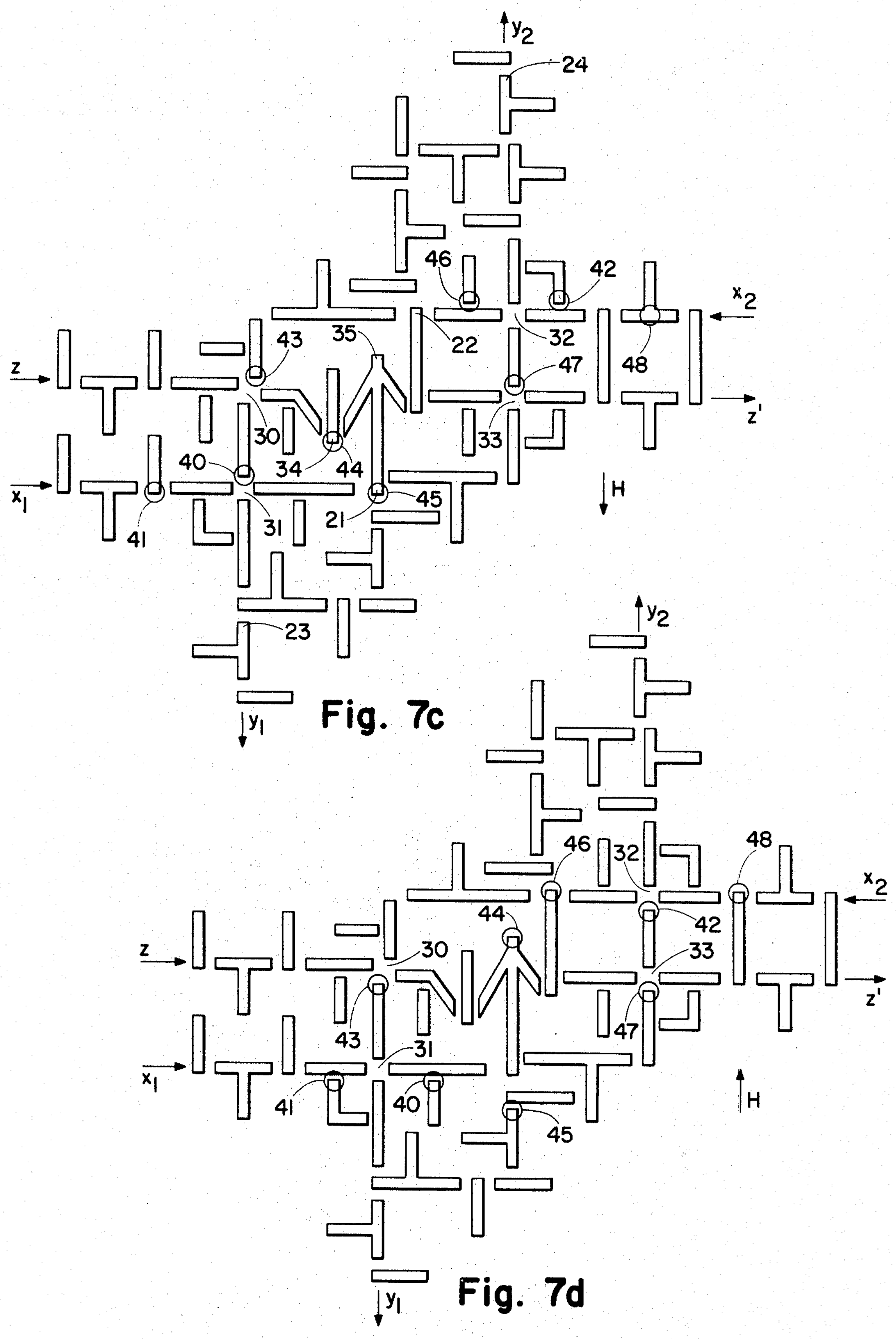
Figures 7E, 7F:
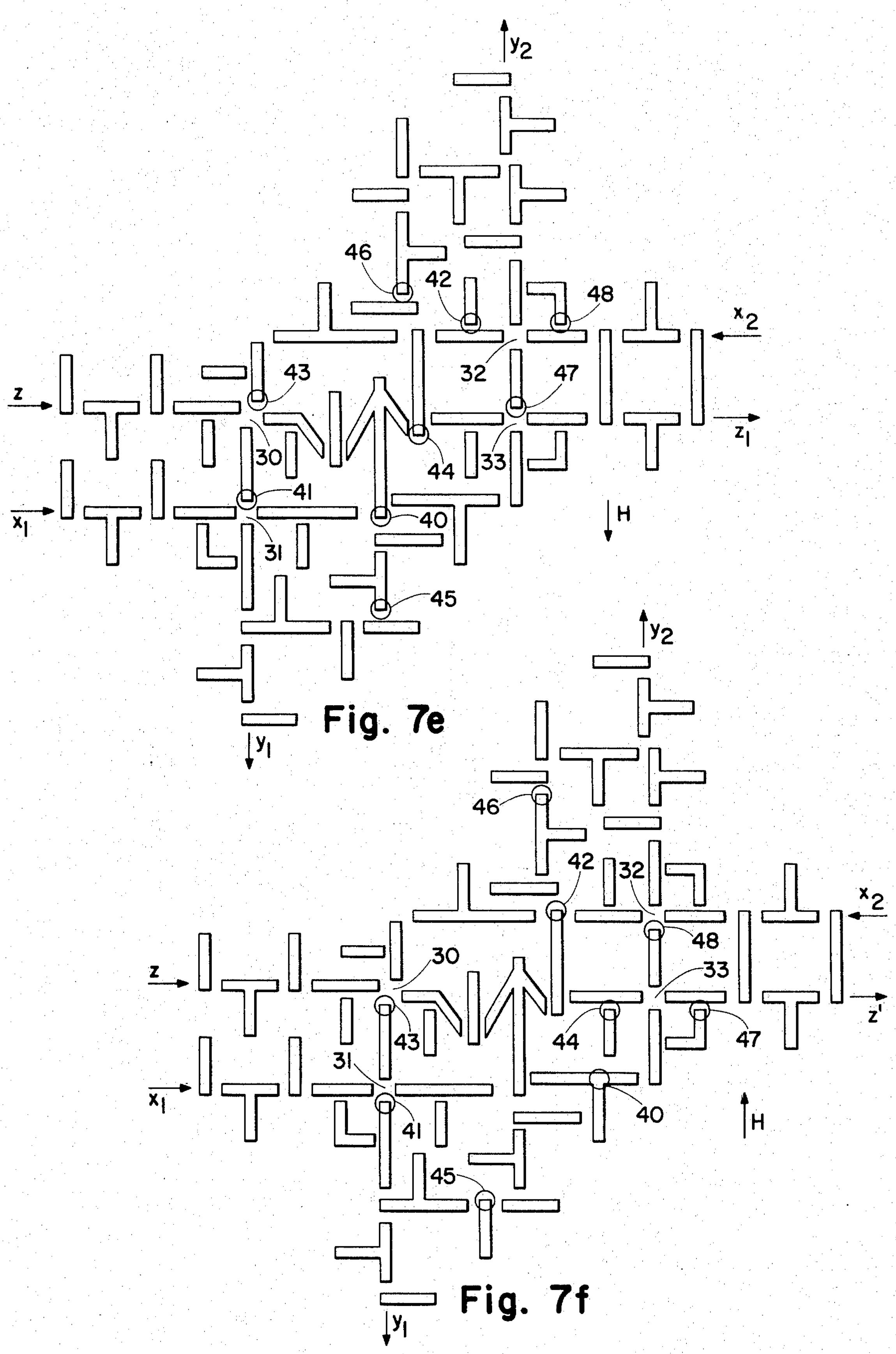
Figures 7G, 7H:
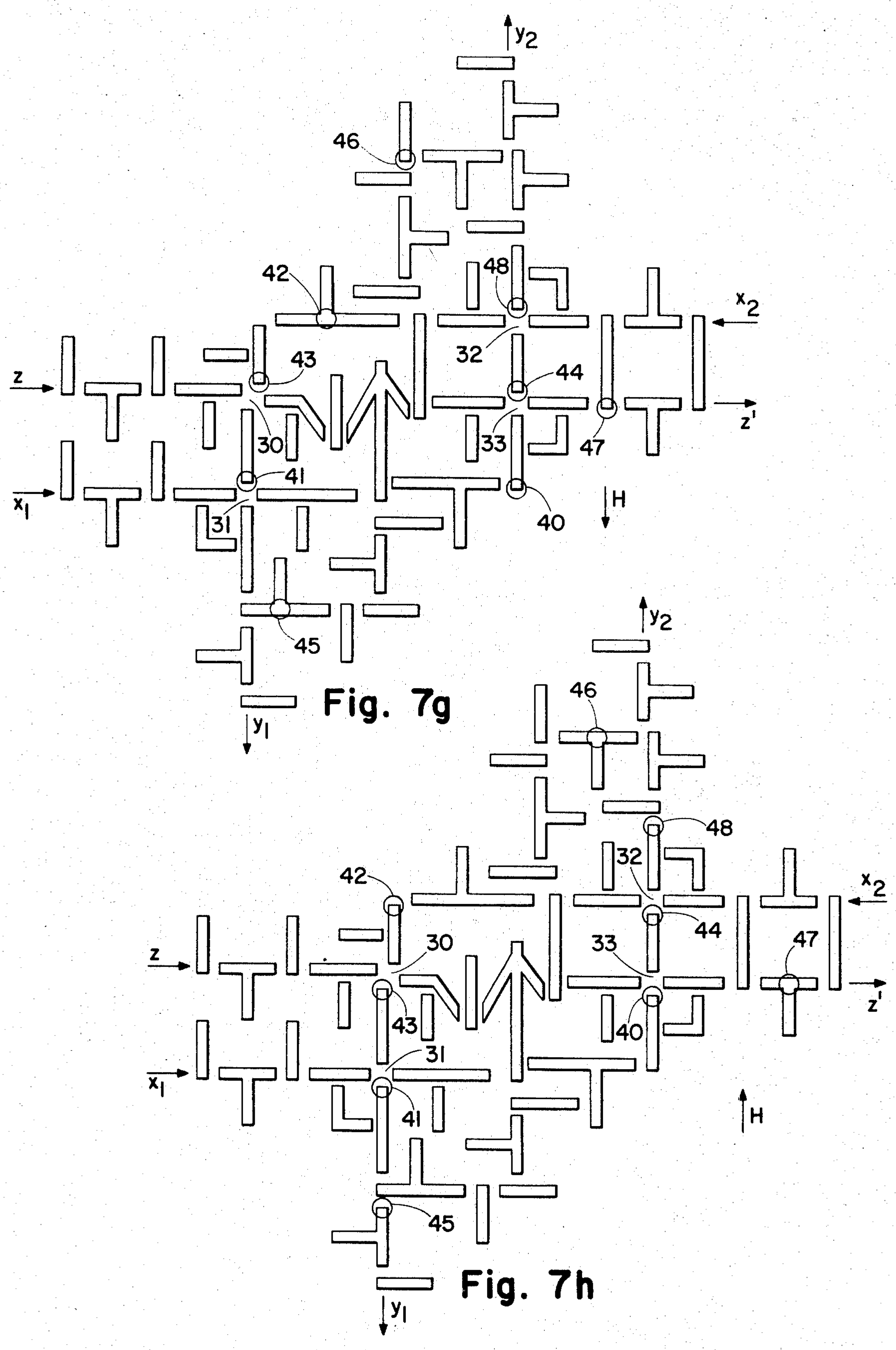
Figures 7I, 7J:
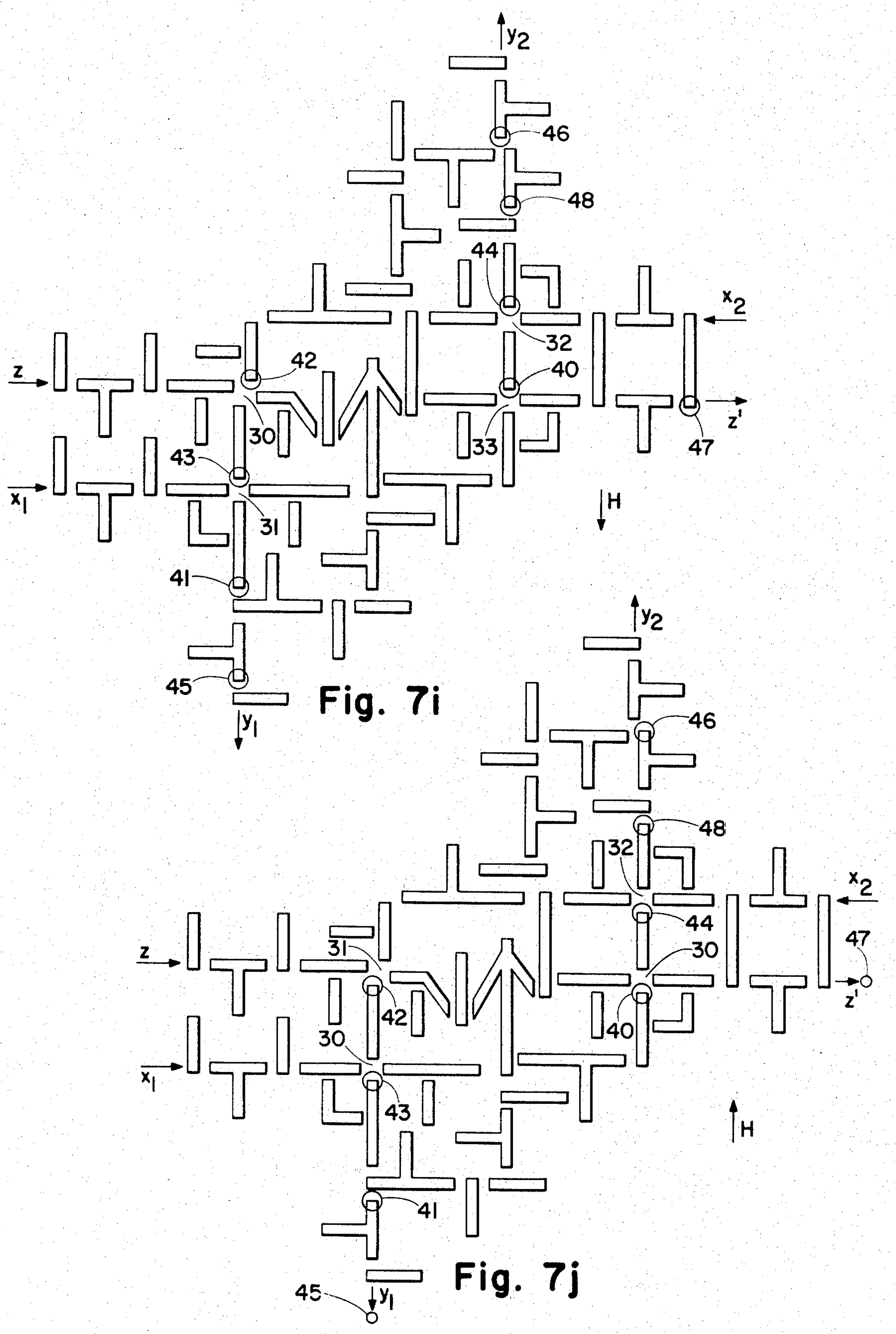

In FIG. 7*c* the in-plane field has now completed one cycle. Now bubbles 43 and 40 are trapped in the idlers 30 and 31 respectively while bubbles 44 and 45 propagate into positions 34 and 21 respectively. Bubble 44 interacts on input position 21. Due to magnetic repulsion between bubble 44 at the interaction position 34 and bubble 45 at position 21, bubble 45 deflects from which would be its normal propagation path along main channel 26 and enters interconnecting channel 28. FIG. 7*d* shows the situation one half cycle later. Bubble 42 has replaced 46 in idler 32. At this position bubble 46 is effected by bubble 44 which has propagated to interaction position 35. Bubble 46 is deflected from its normal propagation path in the second main channel 27 into the second interconnecting channel 29 (See FIG. 6).

The remaining FIGS. 7*e* to 7*j* illustrate further propagation steps, one half cycle apart. Bubbles 41 and 48 replace bubbles 40 and 42 in the idlers 31 and 32. As no bubbles propagate to the interaction positions at the appropriate times, bubbles 40 and 42 propagate along the main channels 26 and 27 respectively. Eventually bubbles 40 and 42 propagate to idler chains 30, 31, 32 and 33 replacing bubbles 41 and 48 in idlers 31 and 32 respectively. The bubbles 45 and 46 achieve the output positions 23 and 24 one period ahead of bubbles 41 and 48. Since it is arranged that the number of propagation steps from an input to an output is independent of the path travelled —by main channel or by interconnecting channel— only one bubble reaches an output position during one period. This is also because two bubbles entering $x_1$ and $x_2$ at the same time both either change their propagation path into an interconnecting channel or remain in a main channel. Thus any interference at merging points is avoided. It is emphasized that the number of propagation steps from an input to an output is independent of the path travelled —not the number of propagation positions. Thus, considering FIG. 7*g* —propagation of bubble 40 causes bubble 44 to be ejected from idler 33 —which in turn causes bubble 48 to be ejected from idler 32. Thus one propagation step moves bubble 40 one position but bubble 48 also moves —but eight positions further on.

As previously stated, once the device is in operation, there is a bubble either in or associated with each idler at all times. By this is meant that a bubble will either be in one of the four alternate propagation positions relating to an idler, the particular position depending upon the orientation of the rotating in-plane magnetic field, or that a bubble is in the process of ejection from an idler by a bubble propagating toward that idler. It will be appreciated that it is not possible for two bubbles to be present in one idler and therefore as one bubble approaches an idler, the bubble in that idler is ejected. This can be seen in FIGS. 7*a* and 7*b* for example. In FIG. 7*a* bubbles 44, 45, 46 and 47 reside in idlers 30, 31, 32 and 33 respectively. In 7*b*, bubbles 46 and 47 still reside in idlers 32 and 33 respectively although occupying propagation positions which differ from those in FIG. 7*a*. However bubbles 44 and 45 are being ejected from idler 30 and 31 by bubbles 43 and 40 respectively. In FIG. 7*c* bubbles 43, 40 and 47 reside in idlers 30, 31 and 33 respectively, but now bubble 46 is ejected by bubble 42.

Alternatively to the layout shown in FIG. 6, other configurations which perform the same basic functions are conceivable. For instances, the control channel $z$ could be replaced by a bubble trap (idler), which is accessible either from the channels $x_1$ and/or $x_2$ or from a separate channel, thus performing a control function over a longer period of time with the same bubble.

While alternative layouts or patterns, other than as in FIG. 6, are possible, the pattern in FIG. 6 provides for a minimal size, that is minimal time for a function. Variations in the pattern are likely to increase the time factor, and also the size, thus giving a less efficient device. However in some circumstances some departure from the highest efficiency may be permissible —or even necessary— possibly because of some other parameter. Some layouts can reduce the number of crossovers for example, at the expense of path length and thus time.

The minimum desiderata for a device are: two inputs, two outputs, one control and two interaction areas. Crossovers —or idlers— are necessary whenever two channels cross, or intersect. The number of propagation steps between any input position and any output position must be equal.

The control function can also be performed by means of a locally applied external magnetic field which can be generated using overlay patterns of wires. Thus faster access is possible which is especially useful, when a signal has to be supplied to a large number of gates in parallel, thereby also overcoming the difficulty of extensive bubble duplication, which consumes both considerable time and area for the appropriate devices.

What is claimed is:

1. A switching device for magnetic bubble domains propagated in a layer of material, the switching device comprising a magnetizable overlay pattern having:

first and second main channels each having an input position and an output position;

first and second interconnecting channels connected between the respective input positions and opposite output positions of the main channels;

a control channel having interaction positions adjacent each of the input positions, the control channel being substantially parallel to the input channels at said interaction positions; and domain idling positions at the crossing of any one of said channels by any other of said channels;

the device arranged that a domain at an input position of either of the main channels will be deflected into the respective interconnecting channel by the simultaneous occurrence of a domain at the adjacent interaction position in the control channel, the number of propagation steps from either input positions to either output positions equal in all circumstances.

2. A switching device as claimed in claim 1, the first and second main channels spaced apart in parallel array and crossing over the control channel to extend from said control channel in opposite directions to said output positions.

3. A switching device as claimed in claim 2, wherein said interconnecting channels extend parallel to each other one on each side of the control channel, in opposite directions.

4. A switching device as claimed in claim 2, including first and second input channels, the first input channel connected to said first main channel at the input position thereof and the second input channel connected to said second main channel at the input position thereof.

* * * * *

Notice of Adverse Decision in Interference

In Interference No. 98,708, involving Patent No. 3,770,978, W. E. Kluge, MAGNETIC BUBBLE DOMAIN SWITCHING DEVICE, final judgment adverse to the patentee was rendered Dec. 29, 1976, as to claim 1.

[*Official Gazette July 5, 1977.*]